(12) United States Patent
Shan

(10) Patent No.: US 7,161,602 B2
(45) Date of Patent: Jan. 9, 2007

(54) PIXEL INTERPOLATION METHOD AND RELATED PIXEL INTERPOLATION SYSTEM

(75) Inventor: Pei-Min Shan, Hsin-Chu (TW)

(73) Assignee: MStar Semiconductor, Inc., Hsin-Chu Hsien (TW)

( * ) Notice: Subject to any disclaimer, the term of this patent is extended or adjusted under 35 U.S.C. 154(b) by 0 days.

(21) Appl. No.: 10/907,609

(22) Filed: Apr. 7, 2005

(65) Prior Publication Data

US 2005/0225564 A1    Oct. 13, 2005

Related U.S. Application Data

(60) Provisional application No. 60/560,622, filed on Apr. 9, 2004.

(51) Int. Cl.
- G09K 9/32 (2006.01)
- G09K 9/40 (2006.01)
- G09G 5/00 (2006.01)
- H04N 7/01 (2006.01)
- H03L 7/00 (2006.01)
- H04N 5/14 (2006.01)

(52) U.S. Cl. ............ 345/606; 345/611; 345/643; 348/448; 348/538; 382/260; 382/300

(58) Field of Classification Search ........ 345/428, 345/606–607, 611, 612, 618, 643; 348/439–440, 348/448, 490, 538, 452, 699; 382/254, 266, 382/296–297, 300

See application file for complete search history.

(56) References Cited

U.S. PATENT DOCUMENTS

| | | | |
|---|---|---|---|
| 6,262,773 B1 * | 7/2001 | Westerman | 348/448 |
| 6,924,844 B1 * | 8/2005 | Kawamura et al. | 348/448 |
| 2004/0246546 A1 * | 12/2004 | Minami et al. | 358/525 |
| 2005/0140664 A1 * | 6/2005 | Kawamura et al. | 345/204 |

* cited by examiner

*Primary Examiner*—Wesner Sajous
(74) *Attorney, Agent, or Firm*—Winston Hsu

(57) ABSTRACT

A pixel interpolation method includes: utilizing a plurality of pixel pairs on two successive scan lines to determine at least one first possible angle; utilizing a plurality of pixel value distribution trends of the two successive scan lines to determine at least one second possible angle; comparing pixel values of a plurality of pairs of neighboring pixels to detect whether the pixel values are larger than a threshold value in order to determine at least one third possible angle; determine a most appropriate angle according to the first, second, and third possible angles; detecting whether the most appropriate angle is correct by examining that the most appropriate angle is in a group; and utilizing a first pixel on the upper scan line of the two successive scan lines and a second pixel on the bottom scan line of the two successive scan lines to interpolate the a target pixel.

21 Claims, 6 Drawing Sheets

Fig. 1 Prior Art

PIXEL INTERPOLATION METHOD AND RELATED PIXEL INTERPOLATION SYSTEM

CROSS REFERENCE TO RELATED APPLICATIONS

The application claims the benefit of U.S. Provisional Application No. 60/560,622, which was filed on Apr. 9, 2004.

BACKGROUND OF INVENTION

1. Field of the Invention

The invention relates to a de-interlacing method and related system, and more particularly, to a pixel interpolation method and related system thereof.

2. Description of the Prior Art

In traditional TV field, video data are broadcasted utilizing an interlacing method. When the interlaced video data is displayed on a digital TV, a de-interlacing procedure should be performed in order to transform the interlaced-scanned video data into progressive-scanned video data. The progressive scan doubles the scan frequency of the interlaced scan.

There are two techniques utilized for de-interlacing. The first technique is to merge an odd field and an adjacent even field into a frame. The second technique is to interpolate the frame.

However, an image is not always still due to motions in a frame. So the even field and the odd field do not correspond to the same picture. As a result, when the two fields are merged, the saw tooth problem occurs. On the other way, interpolation can improve the saw tooth problem. Therefore, when an image is not still, the interpolation method is often utilized instead of the field merging method.

Unfortunately, the interpolation method also has its problems. For example, a scan line can be generated by interpolation utilizing an upper scan line and a lower scan line. FIG. 1 illustrates an interpolation of pixels according to the prior art. Three scan lines respectively comprise 9 pixels $P_{11}P_{12}P_{13}P_{14}P_{15}P_{16}P_{17}P_{18}P_{19}$, $P_{21}P_{22}P_{23}P_{24}P_{25}P_{26}P_{27}P_{28}P_{29}$, and $P_{31}P_{32}P_{33}P_{34}P_{35}P_{36}P_{37}P_{38}P_{39}$. Furthermore, we assume that the picture to be displayed is a black inclined plane. Therefore, the 9 pixels of the first scan line have corresponding pixel values 0, 0, 0, 0, 0, 0, 255, 255, and 255, and the 9 pixels of the third scan line have corresponding pixel values 0, 0, 0, 0, 255, 255, 255, 255, and 255. Please note that the pixel value 0 represents that the grey level is black, and that the pixel value 255 represents that the grey level is white. Theoretically, if the first and the third scan lines are utilized to interpolate the second scan line, the 9 pixels of the second scan line should have corresponding pixel values 0, 0, 0, 0, 0, 255, 255, 255, and 255 such that an ideal black inclined plane can be shown. However, the prior art averages the pixel values of the upper line and the lower line. The result of this averaging causes the 9 pixels of the second scan line to actually have 0, 0, 0, 0, 128, 128, 255, 255, and 255. Therefore the entire picture generates significant pellets due to the averaging pixel value 128.

Therefore, before the interpolation, an edge detection can be performed. The edge detection will detect whether an edge of each picture exists. FIG. 2 is a diagram illustrating the edge detection according to the prior art. Each scan line also has 9 pixels $P_{11}P_{12}P_{13}P_{14}P_{15}P_{16}P_{17}P_{18}P_{19}$, $P_{21}P_{22}P_{23}P_{24}P_{25}P_{26}P_{27}$ $P_{28}P_{29}$, and $P_{31}P_{32}P_{33}P_{34}P_{35}P_{36}P_{37}P_{38}P_{39}$. As mentioned above, the first scan line and the third scan line are utilized to interpolate the needed second scan line. However, before the interpolation, each pixel $P_{2x}$ of the second scan line is utilized as a center to search possible edge angles. For example, in a case of pixel $P_{25}$, the pixels $P_{16}$ and $P_{34}$ are utilized to detect whether 45 degrees is a possible edge angle. In the case of FIG. 1, the interface between the black inclined plane and the white background has a $\tan^{-1}2/2$ edge angle. Therefore, after the correct $\tan^{-1}2/2$ edge angle is detected, the pixels $P_{16}$ and $P_{17}$ on the first scan line and the pixels $P_{34}$ and $P_{35}$ on the third scan line are utilized to correctly interpolate pixel values 0 and 255 of the pixels $P_{25}$-$P_{26}$ on the second scan line. This can solve the above-mentioned problem.

Unfortunately, the interpolation procedure fails when the edge detection is performed because a wrong detection may occur so that an incorrect edge angle is detected. In other words, the interpolation method is incorrect and the displayed picture image will have a serious distortion for the person viewing.

SUMMARY OF INVENTION

It is therefore one of primary objectives of the claimed invention to provide a pixel interpolation method and related system thereof, to solve the above-mentioned problem that the wrong edge detection causes the picture distortion.

According to an exemplary embodiment of the claimed invention, a pixel interpolation method for generating a pixel value of a target pixel in a frame is disclosed. The pixel interpolation method comprises: utilizing a plurality of pixel pairs of two successive scan lines to determine at least a first possible edge angle related to the target pixel, wherein one scan line of the two successive scan lines is above the target pixel and the other scan line of the two successive scan lines is under the target pixel; utilizing a plurality of pixel distribution trends of the two successive scan lines to determine at least a second possible edge angle related to the target pixel; determining a most appropriate edge angle according to the first possible edge angle and the second possible edge angle; and utilizing a first pixel and a second pixel, related to the appropriate edge angle and the target pixel, of the two successive scan lines to interpolate the pixel value of the target pixel.

According to another exemplary embodiment of the claimed invention, a pixel interpolation method for generating a pixel value of a target pixel in a frame is disclosed. The pixel interpolation method comprises: utilizing a plurality of pixel pairs of two successive scan lines to determine at least a first possible edge angle related to the target pixel, wherein one scan line of the two successive scan lines is above the target pixel and the other scan line of the two successive scan lines is under the target pixel; determining at least a second possible edge angle by comparing a plurality of pairs of neighboring pixels on one scan line of the two successive scan lines; determining a most appropriate edge angle according to the first possible edge angle and the second possible edge angle; and utilizing a first pixel and a second pixel, related to the most appropriate edge angle and the target pixel, of the successive scan lines to interpolate the pixel value of the target pixel.

According to another exemplary embodiment of the claimed invention, a pixel interpolation method for generating a pixel value of a target pixel in a frame is disclosed. The pixel interpolation method comprises: determining a possible edge angle related to the target pixel; detecting whether a pixel value difference between a first pixel on the possible edge angle and a second pixel horizontally neighboring to the first pixel is larger than a predetermined threshold value; and if the pixel value difference between the first pixel and the second pixel is larger than the predetermined threshold value, utilizing a third pixel on the possible edge angle and the first pixel to interpolate the pixel value of the target pixel; wherein the third pixel and the first pixel reside on different scan lines of different sides of the target pixel.

According to another exemplary embodiment of the claimed invention, a pixel interpolation system for generating a target pixel in a target position of a frame is disclosed. The pixel interpolation system comprises: an edge angle detector for determining a possible edge angle related to the target pixel; a plane background detecting module coupled to the edge angle detector for detecting whether a pixel value difference between a first pixel on the possible edge angle and a pixel, horizontally neighboring to the first pixel, is larger than a predetermined threshold value; and a pixel interpolation device coupled to the plane background detecting module and the edge angle detector for utilizing a pixel value of a third pixel on the possible edge angle and a pixel value of the first pixel to interpolate the pixel value of the target pixel if the value difference between the first pixel and the second pixel is larger than the predetermined threshold value; wherein the first and the third pixel reside on different scan lines on different sides of the target pixel.

The claimed invention utilizes several limitations to select detected edge angles. In other words, the claimed invention can filter out edge angles. These incorrect edge angles that have been filtered out may possibly be incorrect and therefore prevent from incorrect interpolation. Therefore, the display quality can be improved.

These and other objectives of the present invention will no doubt become obvious to those of ordinary skill in the art after reading the following detailed description of the preferred embodiment that is illustrated in the various figures and drawings.

BRIEF DESCRIPTION OF DRAWINGS

Figure 1:
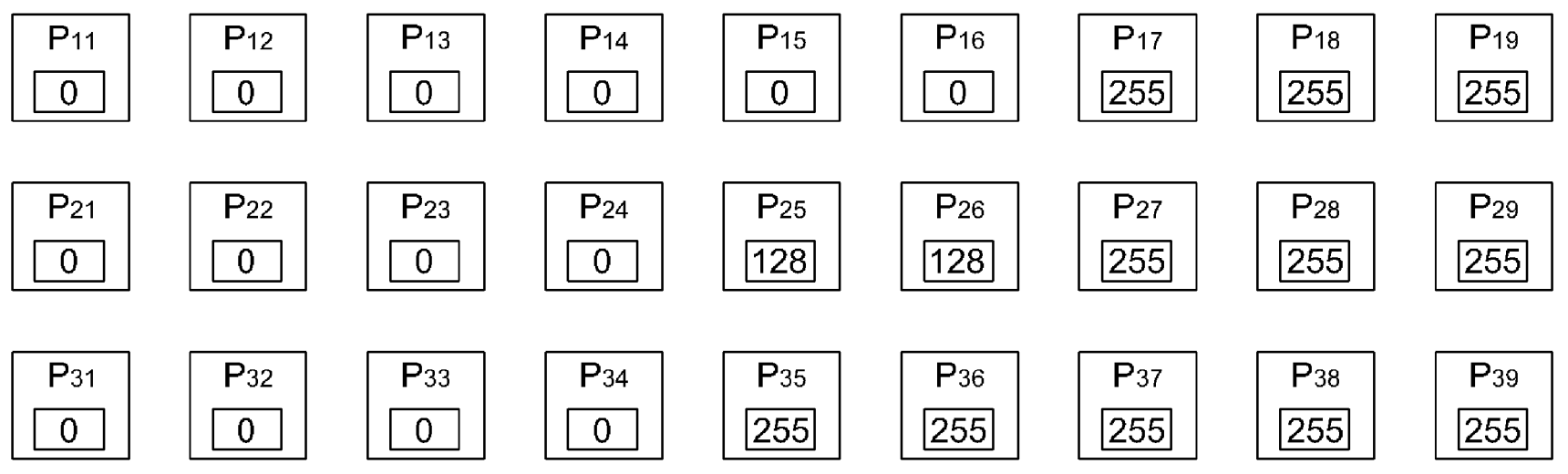

FIG. 1 is a diagram illustrating an interpolation of pixels according to the prior art.

DETAILED DESCRIPTION

As mentioned above, before the interpolation, a correct edge angle detection is critically important. The result of a correct edge angle detection directly influences the display quality. Therefore, in the following disclosure, the present invention discloses several limitations to select detected edge angles.

Figure 2:
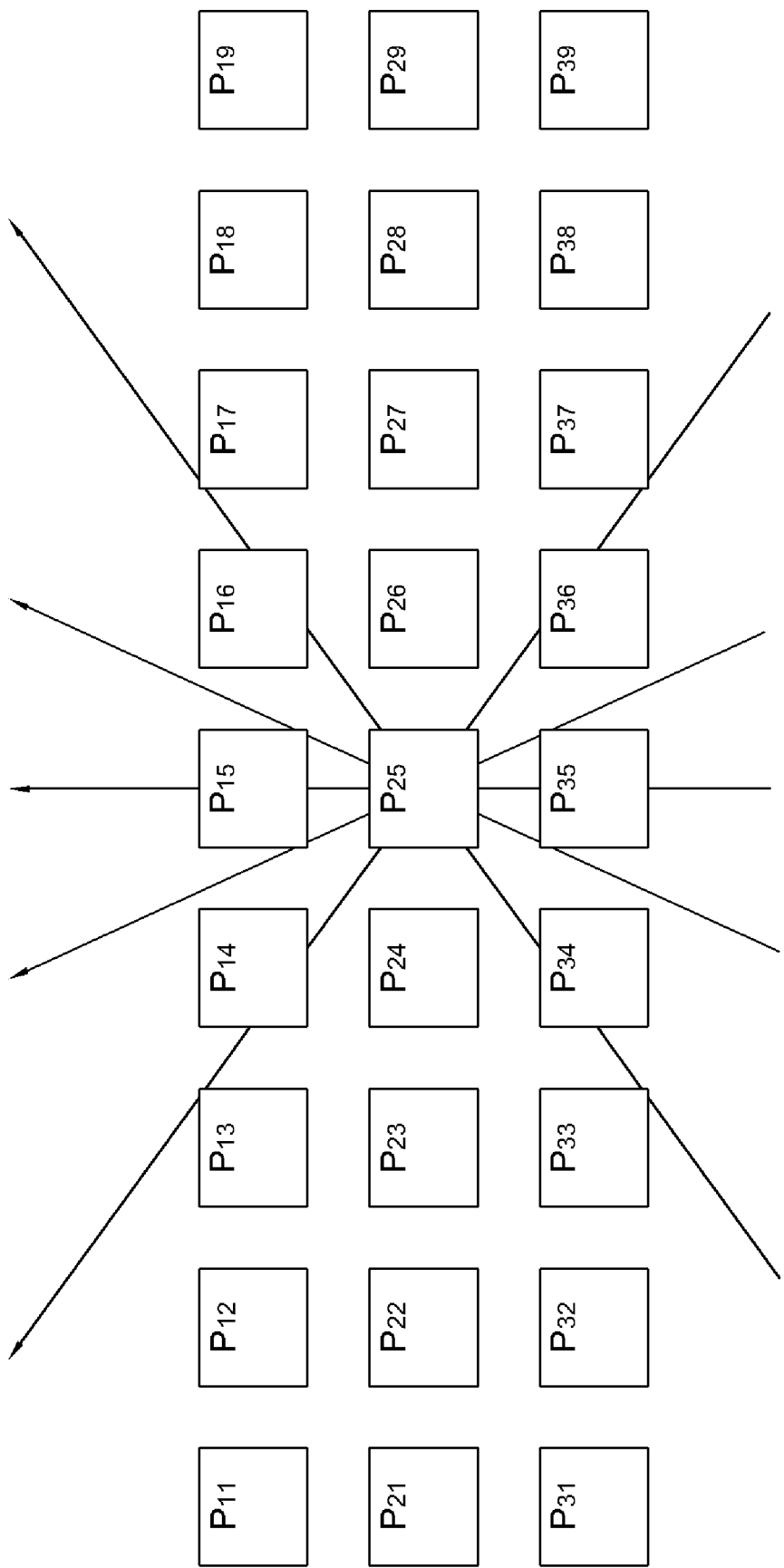
FIG. 2 is a diagram illustrating the edge detection according to the prior art.
Figure 3:
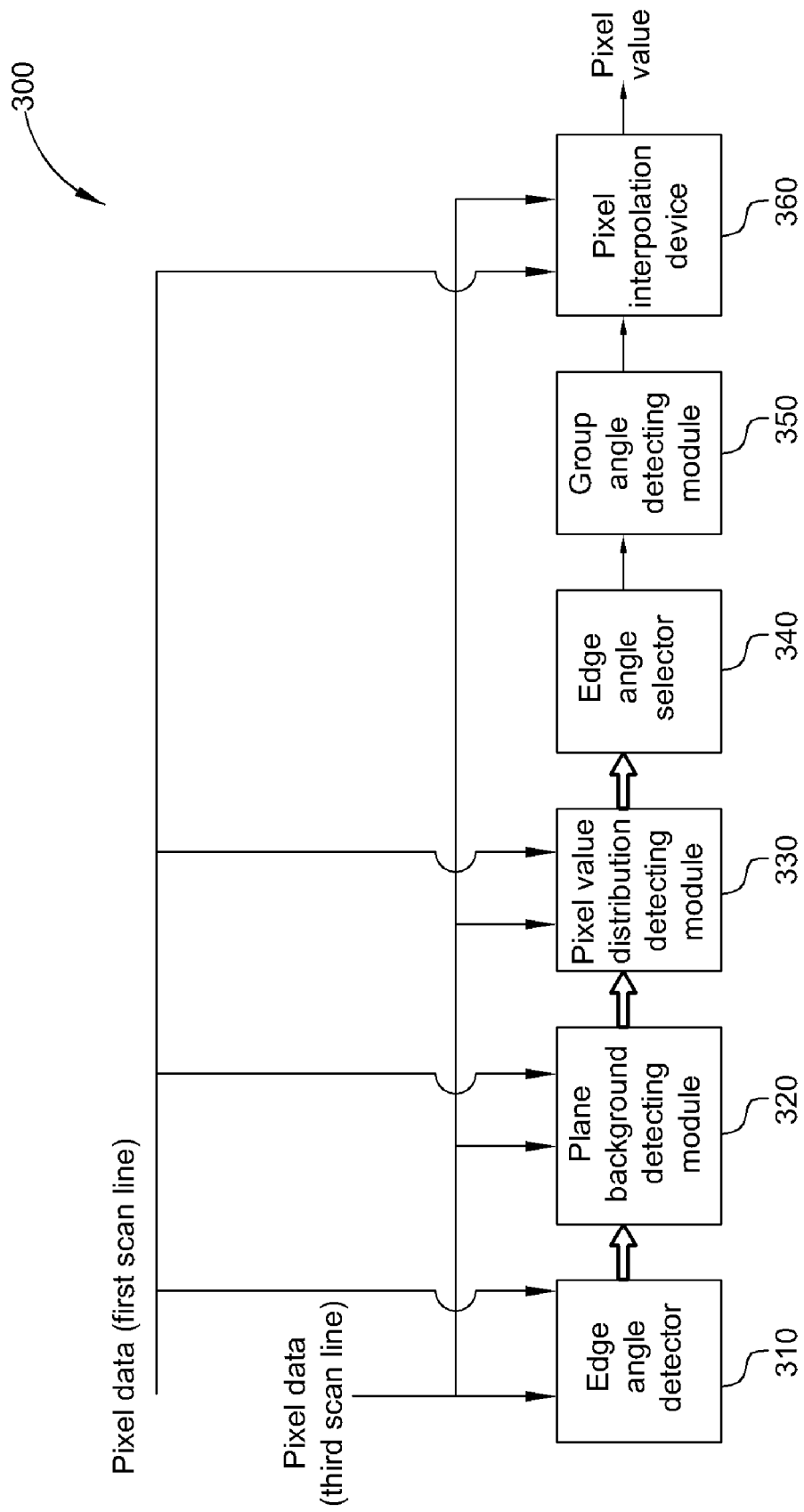
FIG. 3 is a diagram of a pixel interpolation system according to the present invention.

FIG. 3 is a diagram of a pixel interpolation system 300 according to the present invention. The pixel interpolation system 300 comprises an edge angle detector 310, a plane background detecting module 320 coupled to the edge angle detector 310, a pixel value distribution detecting module 330 coupled to the plane background detecting module 320, an edge angle selector 340 coupled to the pixel value distribution detecting module 330, a group angle detecting module 350 coupled to the edge angle selector 340, a pixel interpolation device 360 coupled to the group angle detecting modiste 350. In this embodiment, the edge angle detector 310, the plane background detecting module 320, a pixel value distribution detecting module 330, and the pixel interpolation device 360 can receive two scan lines of a field to interpolate another scan line between the two received scan lines.

Figure 4:
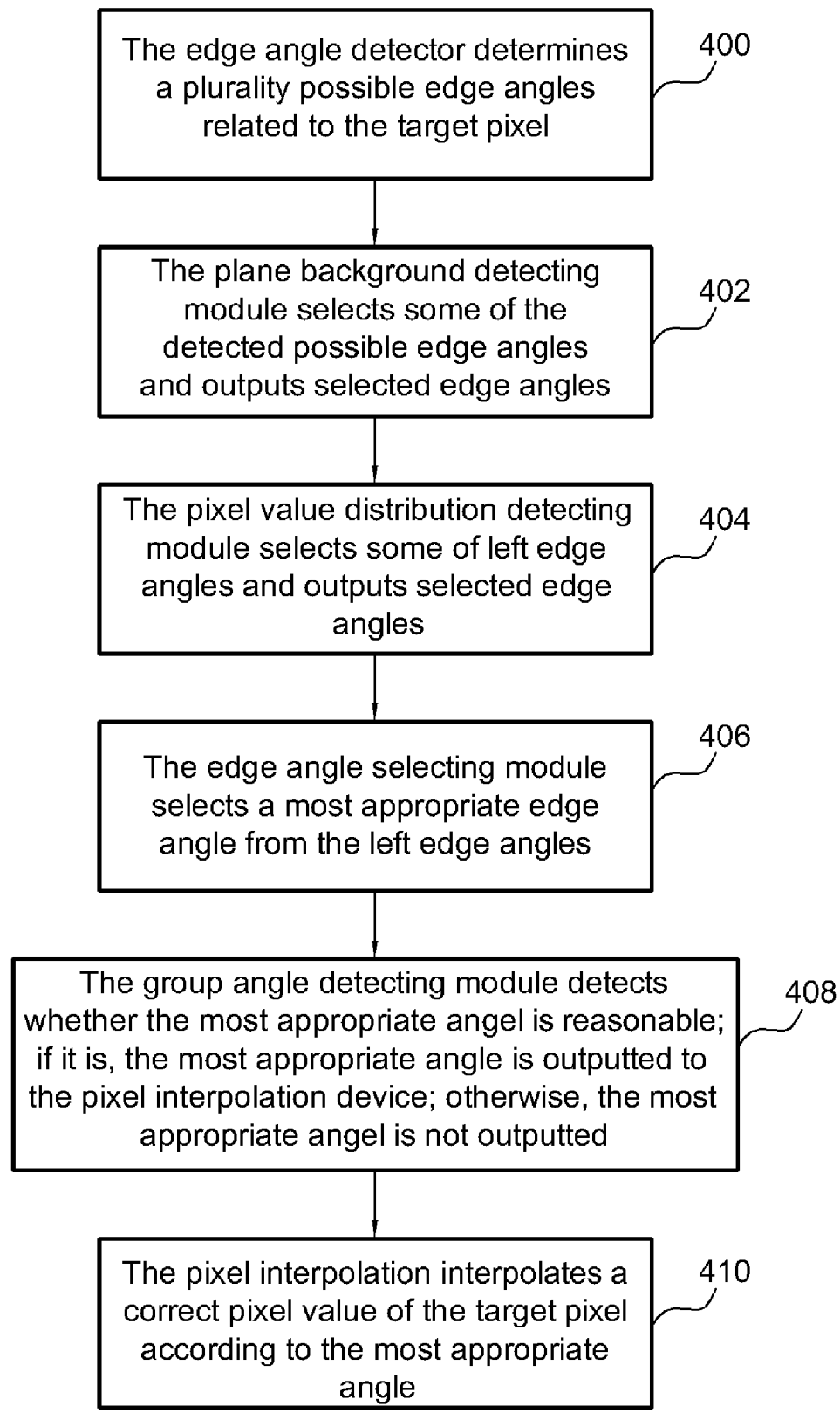
FIG. 4 is a flow chart of the interpolation performed by the pixel interpolation system.

FIG. 4 is a flow chart of the interpolation performed by the pixel interpolation system 300. The flow comprises following steps:

Step 400: The edge angle detector 310 determines a plurality possible edge angles related to the target pixel;

Step 402: The plane background detecting module 320 selects some of the detected possible edge angles and outputs selected edge angles;

Step 404: The pixel value distribution detecting module 330 selects some of the left edge angles and outputs selected edge angles;

Step 406: The edge angle selecting module 340 selects a most appropriate edge angle from the left edge angles;

Step 408: The group angle detecting module 350 detects whether the most appropriate angle is reasonable; if it is, the most appropriate angle is outputted to the pixel interpolation device 360; otherwise, the most appropriate angle is discarded;

Step 410: The pixel interpolation device 360 interpolates a correct pixel value of the target pixel according to the most appropriate angle.

Figure 5:
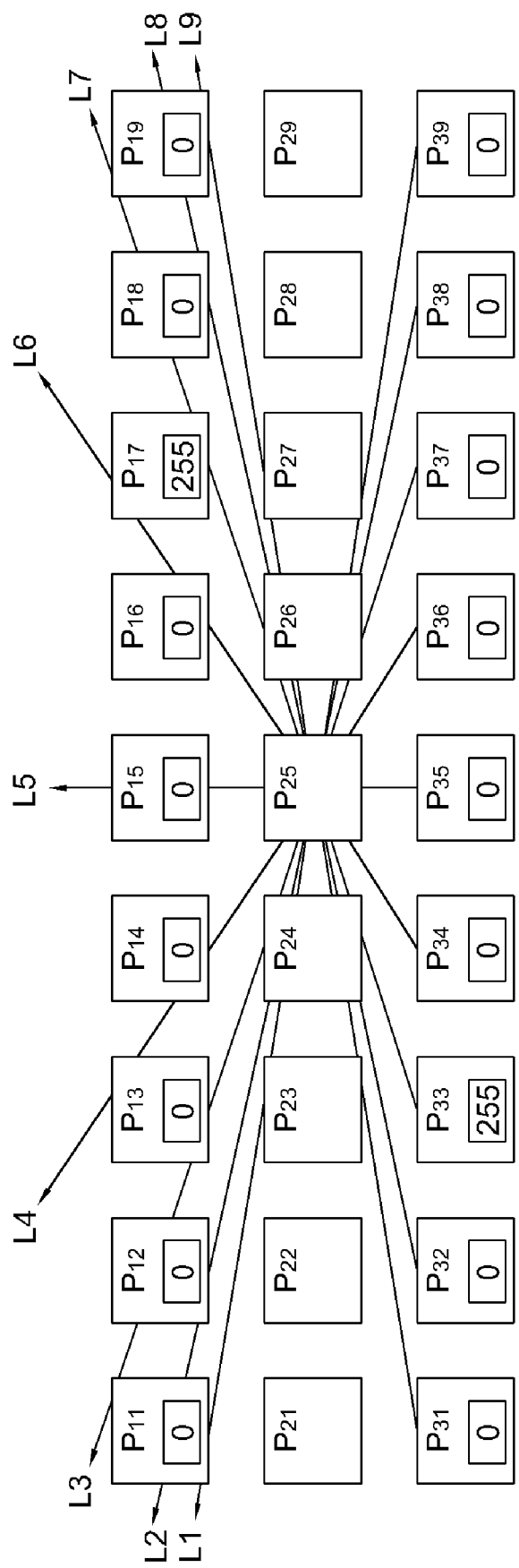
FIG. 5 is a diagram illustrating pixel data of the interpolation according to an embodiment of the present invention.

FIG. 5 is a diagram illustrating pixel data of the interpolation according to an embodiment of the present invention. In this embodiment, a white slope line is present on a black background for explanation. Each scan line respectively comprises 9 pixels $P_{11}P_{12}P_{13}P_{14}P_{15}P_{16}P_{17}P_{18}P_{19}$, $P_{21}P_{22}P_{23}P_{24}P_{25}P_{26}P_{27}$ $P_{28}P_{29}$, and $P_{31}P_{32}P_{33}P_{34}P_{35}P_{36}P_{37}P_{38}P_{39}$. Similar to the above-mentioned case, the first scan line $P_{1x}$ and the third scan line $P_{3x}$ are inputted into the pixel interpolation system 300 to interpolate the second scan line $P_{2x}$. Furthermore, the 9 pixels of the first scan line have corresponding pixel values 0, 0, 0, 0, 0, 0, 255, 0, and 0, the third scan line has corresponding pixel values 0, 0, 255, 0, 0, 0, 0, 0, and 0, and the target pixel is pixel $P_{25}$.

In this embodiment, the edge angle detector 310 utilizes the target pixel $P_{25}$ as a center to detect all possible edge angles (step 400). The possible edge angle is detected because the pixel values of corresponding pixel pairs are similar or the same. Considering the embodiment shown in FIG. 5, every angle of the target pixel $P_{25}$ can be detected because the pixel values of corresponding pixel pairs are identical. For example, the pixel $P_{11}$ and the pixel $P_{39}$ have the same pixel value, the pixel $P_{12}$ and the pixel $P_{38}$ have the same value, etc. Therefore, the edge angle detector 310 can detect edge angles including L1, L2, L3, L4, L5, L6, L7, L8, and L9. It should be noted that only the edge angle L7 is correct.

Please note, that the pixel value difference between a pixel on the edge line and a pixel, next to the pixel on the edge, must be large. In this embodiment, the pixel value difference between the pixel $P_{17}$ and the pixel $P_{18}$ is significantly large. The pixel interpolation system 300 utilizes the plane background detecting module 320 to detect whether the pixel value differences between the pixel on the edge and neighboring pixels is larger than a predetermined threshold value (step 402). For example, considering the edge angle L1, the plane background detecting module 320 compares the pixel value of the pixel $P_{11}$ with the pixel value of the neighboring pixel $P_{12}$ to determine whether the pixel value difference between the pixel $P_{11}$ and the pixel $P_{12}$ (or the pixel value difference between the pixel $P_{38}$ and the pixel $P_{39}$) is larger than the predetermined threshold value. In this embodiment, the pixel value difference between the pixel P11 and the pixel P12 is 0. Therefore, the plane background detecting module 320 determines that the edge angle L1 lies in the background and not the edge. So as a result the edge angle L1 is filtered out. Furthermore, the plane background detecting module 320 performs the above-mentioned detection on each edge angle to select the appropriate edge angles. For the next process, the plane background detecting module 320 outputs selected edge angles to the pixel value distribution detecting module 330.

In addition, for a correct edge angle, the pixel value distributions of received scan lines near the edge should be similar theoretically. In this embodiment, the pixel value distributions of the pixels $P_{16}P_{17}P_{18}$ and the pixels $P_{32}P_{33}P_{34}$ are quite similar in that they are all "rise first, and then drop". Therefore, after the pixel value distribution detecting module 330 receives the edge angles outputted by the plane background detecting module 320, the pixel distribution detecting module 330 detects the above-mentioned pixel value distributions. For example, considering the edge angle L7, the pixel distribution detecting module 330 detects the pixel distributions of the pixels $P_{16}P_{17}P_{18}$ and the pixels $P_{32}P_{33}P_{34}$. In this embodiment, the pixel value distribution trend of the pixels $P_{16}P_{17}P_{18}$ is "rise first, and then drop", and the pixel value distribution trend of the pixels $P_{32}P_{33}P_{34}$ is also "rise first, and then drop". Therefore, the pixel value distribution detecting module 330 determines that the edge angle L7 is a correct edge angle (step 404). Similarly, the pixel value distribution detecting module 330 also performs the above-mentioned distribution detection on each edge angle in order to output selected angles to the edge angle selector 340.

The edge angle selector 340 selects the most appropriate angle from all of the selected possible edge angles. Normally, if an edge angle is closer to 90 degrees then the edge angle has a great possibility of being correct. Therefore, the edge angle selector 340 preferably selects the edge angle closest to 90 degrees. Then, the most appropriate angle is outputted to the group angle detecting module 350 (step 406).

After the mast appropriate edge angle related to the target pixel $P_{25}$, is selected, the pixel interpolation system 300 then utilizes the group angle detecting module 350 to detect whether the selected most appropriate angle is reasonable. In this embodiment, the group angle detecting module 350 compares the most appropriate edge angle with existing edge angles related to neighboring pixels. In this embodiment, the neighboring pixels preferably are the pixels that are on the same scan line of the target pixel and nearby the target pixel. For example, the pixel $P_{24}$ or the pixel $P_{26}$. Preferably, correct edge angles appear in groups. For example, there is very little probability that the pixel $P_{24}$ and $P_{26}$ correspond to the edge angle L7 but the pixel $P_{25}$ has a different edge angle L3. Therefore, the group angle detecting module 350 can determine whether the most appropriate edge angle is reasonable by comparing these neighboring edge angles with the most appropriate edge angle. For example, the group angle detecting module 350 can detect an angle difference between the edge angle of the target pixel $P_{25}$ and the edge angles of the pixels $P_{24}$ and $P_{26}$ (step 408). If the angle difference is larger than a group angle threshold value then the group angle detecting module 350 determines that the most appropriate angle is not correct. Then, the most appropriate angle is not outputted to the pixel interpolation device 360. On the other hand, if the angle difference is less than the group angle threshold value, the group angle detecting module 350 outputs the most appropriate angle to the pixel interpolation device 360. The pixel interpolation device 360 performs the pixel interpolation according to the most appropriate edge angle to generate a correct pixel value of the target pixel $P_{25}$ (step 410).

Furthermore, the edge angle detector 310, the pixel value distribution detecting module 330, and the plane background detecting module 320 can be coupled through buses. For example, if a designer intends to filter nine edge angles as mentioned above, the bus width could be implemented as nine physical signal lines. The edge angle detector 31 0, the pixel distribution detecting module 330, and the plane background detecting module 320 can selectively assert the signal lines on the bus to inform the possible edge angles to a next stage. Similarly, the edge angle selector 340 can inform the selected most appropriate edge angle to the group angle detecting module 350.

According to above-mentioned disclosure, those skilled in the art should understand that the coupling relationships of the block diagram shown in FIG. 3 may have many different configurations that achieve the identical function. For example, the edge angle detector 310, the pixel distribution detecting module 330, and the plane background detecting module 320 can be parallelly interconnected to output the selecting results to an AND gate. So the possible edge angles can be selected.

In addition to the above-mentioned limitations, the present invention can further utilize other prior art limitations to ensure that the edge angle is correct. For example, successive pixel pairs with the same possible edge angle can be utilized to confirm whether the edge angle is correct or not. Utilizing the edge angle L3 shown in FIG. 5 as an example, the pixels, $P_{14}$ $P_{38}$ or the pixels $P_{12}$ $P_{36}$ are the above-mentioned pixel pairs. If the edge angle L3 is correct, the pixel value difference between the pixel $P_{14}$ and the pixel $P_{38}$ should be small. This limitation can also be added into the pixel interpolation system 300 of the present invention to further ensure that the selected edge angles are correct. This change does not depart from the spirit of the present invention. In addition, the present invention does not limit the order of the steps in the flow. That is, the pixel interpolation system 300 can first utilize the pixel distribution detecting module 330, and then utilize the plane background detecting module 320. In this embodiment, the order is only utilized as a preferred embodiment, not a limitation. Furthermore, the pixel interpolation system 300 does not limit the number of the edge angles to be detected. In other words, the edge angle detector 310 can detect more edge angles or less edge angles according to various design requirements. This change neither departs from the spirit of the present invention. Furthermore, in order to increase the efficiency of the image processing, because the edge angle having lower degrees has more possibilities of being incorrect, the pixel interpolation system 300 according to the present invention can be designed to enhance examining the edge angles with low degrees.

In addition, the present invention can be implemented in a digital TV or related applications of a digital TV in order to improve the display quality. Please note, that in the above-mentioned embodiment, only one kind of pixel value (e.g., the luminance value) is utilized as an illustration. However, the present invention can utilize a plurality of kinds of pixel values for interpolation. For example, the present invention can be utilized in an RGB system where it could perform independent color interpolation for each color (e.g., red R, green G, and blue B).

Figure 6:
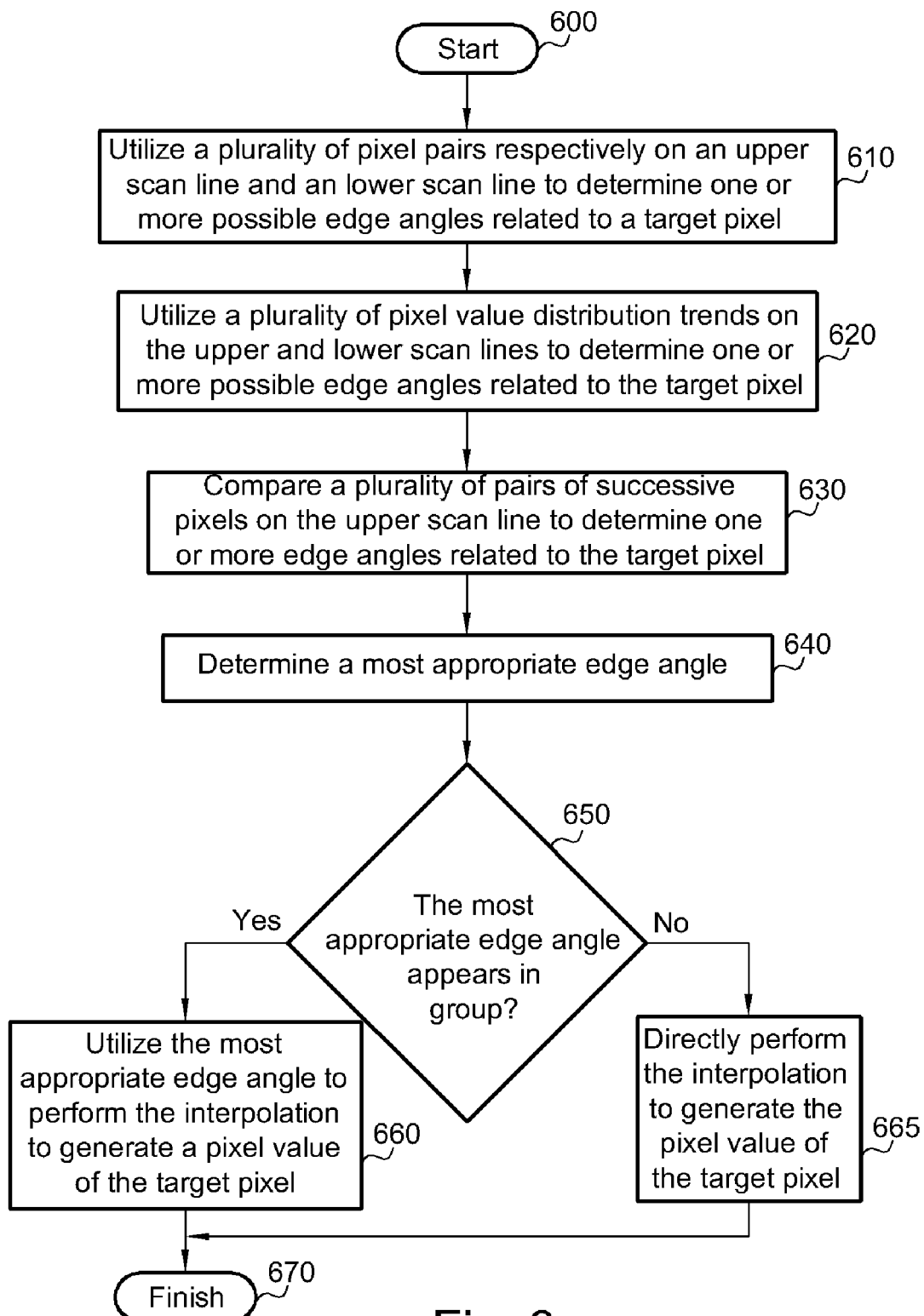
FIG. 6 is a flow chart illustrating an interpolation method according to an embodiment of the present invention.

FIG. 6 is a flow chart illustrating an interpolation method according to one embodiment of the present invention. The interpolation method is utilized to generate the pixel value of the target pixel in a frame. Based on the above-mentioned illustration, those skilled in the art can understand the spirit of the following flow chart. The how chart scars from the step 600. In step 610, a plurality of pixel pairs on the tipper scan line and lower scan line at different sides of the target pixel are utilized to determine one or more first possible edge angles related to the target pixel. In this embodiment, for a correct edge angle associated with a pixel pair of a first pixel on the upper scan line and a second pixel on the lower scan line, the pixel values of the first and the second pixels should be similar. Therefore, a plurality of edge angles are detected. In this embodiment, please note that the upper scan line and the lower scan line respectively correspond to the first scan line and the third scan line shown in FIG. 3, while the second scan line is the scan line to be interpolated. Depending on different hardware complexities, 20 or 40 angles can be detected to see if there are possible edge angles. In this embodiment, if we try to detect 20 angles, maybe there is no possible edge angle so that the original interpolation is not influenced. In addition, there might be only one possible edge angle or several edge angles. Therefore, the flaw can be utilized to find the most correct edge angle from the detected possible edge angle so that the proper interpolation can be performed. Please note, that if a correct edge angle is not finally determined to perform the proper interpolation, or an incorrect interpolation is performed because a false edge angle is finally detected, both cause incorrect pixel interpolation result.

In step 620, a plurality of pixel value distribution trends of the upper scan line or the lower scan line are utilized to determine one or more second possible edge angles. Each angle centered at the target pixel intersects with the upper scan line and the lower scan line at two pixels and the pixel value distributions on these two pixels are compared. For example, a certain angle can be determined as a possible edge angle if an upper pixel value distribution trend, which corresponds to the certain angle, of the upper scan line (that is, the pixel value distribution trend of an intersected pixel where the certain angle crosses the upper scan line) is substantially the same as a lower pixel value distribution trend (For example, "rise first and then drop"), which corresponds to the certain angle, of the lower scan line. In this embodiment, the pixel value distribution trends have to be substantially the same so that the certain angle is determined as the possible edge angle.

In step 630, a plurality of pairs of neighboring pixels on the upper scan line or the lower scan line are compared in order to determine one or more third possible edge angles associated with the target pixel. For example, a pixel associated with an angle on the upper scan line (the pixel is the intersection of the angle crossing the upper scan line), and another pixel horizontally neighboring to the pixel are compared. That is, the pixel value difference of the two neighboring pixels, both located on the upper scan line or both located on the lower scan line, is detected to determine whether the pixel value difference is larger than a predetermined threshold value. For example, if an angle corresponds to an edge line, the neighboring pixels associated with the angle should have a large pixel value difference.

In step 640, the most appropriate edge angle is determined according to the first possible edge angles, the second possible edge angles, and the third possible edge angles. Preferably, an edge angle closest to 90 degrees is selected.

In step 650, it is necessary to detect if whether the most appropriate edge angle appears in the group to determine if the most appropriate edge angle is correct. In this embodiment, a plurality of existing edge angles related to pixels horizontally adjacent to the target pixel are compared with the most appropriate edge angle to determine whether angle differences are less than a group angle difference threshold value. If the angle differences are less than the group angle difference threshold value then the most appropriate edge angle is correct. A edge angle related to the target pixel significantly different from other pixels near the target pixel should not be allowed. And then, if the most appropriate edge angle is correct, the step 660 is performed. In step 660, utilizing a first pixel and a second pixel associated with the most appropriate edge angle crossing the upper scan line and the lower scan line interpolates the pixel value of the target pixel. In addition, if the most appropriate edge angle is determined as being incorrect, the step 665 is performed to perform an original interpolation so that the pixel value of the target pixel is directly generated without reference to any edge angle.

Please note that the above-mentioned steps 610, 620, and 630 is not in a strict order. In addition, the number of received scan lines can be increased, but the corresponding hardware may become more complex as a result. In contrast to the prior art, the present invention can detect the edge angles more correctly and efficiently so that the prior art problem of wrong edge angle detection can be overcome and the display quality can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pixel interpolation method for generating a pixel value of a target pixel in a frame, the pixel interpolation method comprising:

utilizing a plurality of pixel pairs of two successive scan lines to determine at least one first possible edge angle associated with the target pixel, wherein one scan line of the two successive scan lines is above the target pixel and the other scan line of the two successive scan lines is under the target pixel;

utilizing a plurality of pixel distribution trends of the two successive scan lines to determine at least one second possible edge angle associated with the target pixel;

determining a most appropriate edge angle according to said at least one first possible edge angle and said at least one second possible edge angle; and interpolating the pixel value of the target pixel utilizing a first pixel and a second pixel associated with the appropriate edge angle and the target pixel and respectively located on the two successive scan lines, wherein the first pixel and the second pixel reside on different scan lines located on different sides of the target pixel.

2. The pixel interpolation method of claim 1 further comprising:

determining at least one third edge angle associated with the target pixel by comparing a plurality of pairs of neighboring pixels on one scan line of the two successive scan lines.

3. The pixel interpolation method of claim 1, further comprising:
   determining at least one third edge angle associated with the target pixel by comparing a plurality of pairs of neighboring pixels on each scan line of the two successive scan lines.

4. The pixel interpolation method of claim 2, wherein the step of determining the most appropriate edge angle comprises:
   determining a most appropriate edge angle according to the first possible edge angle, the second possible edge angle, and the third possible edge angle.

5. The pixel interpolation method of claim 3, wherein the step of determining the most appropriate edge angle comprises:
   determining a most appropriate edge angle according to the first possible edge angle, the second possible edge angle, and the third possible edge angle.

6. The pixel interpolation method of claim 4, wherein the step of determining the most appropriate edge angle comprises:
   determining a plurality of final possible edge angles according to the first possible edge angle, the second possible edge angle, and the third possible edge angle; and
   selecting the most appropriate edge angle having a largest edge angle among the final possible edge angles.

7. The pixel interpolation method of claim 4, further comprising:
   comparing the most appropriate edge angle with a plurality of existing edge angle of pixels to determine whether the most appropriate edge angle is correct;
   wherein the pixels are horizontally neighboring to the target pixel.

8. The pixel interpolation method of claim 7, wherein the step of determining whether the most appropriate edge angle is correct comprises:
   determining that the most appropriate edge angle is correct if differences between the existing edge angles and the most appropriate edge angle are less than a group angle difference threshold value.

9. A pixel interpolation method for generating a pixel value of a target pixel in a frame, the pixel interpolation method comprising:
   utilizing a plurality of pixel pairs of two successive scan lines to determine at least one first possible edge angle associated with the target pixel, wherein one scan line of the two successive scan lines is above the target pixel and the other scan line of the two successive scan lines is under the target pixel;
   determining at least one second possible edge angle by comparing a plurality of pairs of neighboring pixels on one scan line of the two successive scan lines to detect whether the difference between the pair of the neighboring pixels of the scan line is lager than a threshold value;
   determining a most appropriate edge angle according to the first possible edge angle and the second possible edge angle; and
   utilizing a first pixel and a second pixel, associated with the most appropriate edge angle and the target pixel, of the successive scan lines to interpolate the pixel values of the target pixel.

10. The pixel interpolation method of claim 9, further comprising:
    utilizing a plurality of pixel distribution trends of the two successive scan lines to determine at least one third possible edge angle associated with the target pixel.

11. The pixel interpolation method of claim 10, wherein the third possible edge angle is determined by comparing an upper pixel value distribution trend of an upper scan line of the two successive scan lines with a under pixel value distribution trend of an under scan line of the two successive scan lines in order to detect whether the two pixel value distribution trends are substantially the same.

12. The pixel interpolation method of claim 10, wherein the step of determining the most appropriate edge angle comprises:
    determining the most appropriate angle according the first possible edge angle, the second possible edge angle, and the third possible edge angle.

13. The pixel interpolation method of claim 9, further comprising:
    comparing the most appropriate edge angle with a plurality of existing edge angle of neighboring pixels to determine whether the most appropriate edge angle is correct;
    wherein the neighboring pixels are horizontally neighboring to the target pixel.

14. The pixel interpolation method of claim 13, wherein the step of determining the most appropriate edge angle comprises:
    determining that the most appropriate edge angle is correct if differences between the existing edge angles and the most appropriate edge angle is less than a group angle difference threshold value.

15. A pixel interpolation method for generating a pixel value of a target pixel in a frame, the pixel interpolation method comprising:
    determining a possible edge angle associated with the target pixel;
    detecting whether a pixel value difference between a first pixel on the possible edge angle and a second pixel horizontally neighboring to the first pixel is larger than a predetermined threshold value; and
    interpolating the pixel value of the target pixel utilizing a third pixel on the possible edge angle and the first pixel if the pixel value difference between the first pixel and the second pixel is larger than the predetermined threshold value;
    wherein the third pixel and the first pixel reside on different scan lines of different sides of the target pixel.

16. The pixel interpolation method of claim 15, further comprising:
    comparing a pixel value distribution trend of the first pixel and a pixel, horizontally neighboring to the first pixel, with another pixel value distribution trend of the third pixel and a pixel, horizontally neighboring to the third pixel, to detect whether the two pixel value distribution trends are the same; and
    if the two pixel value distribution trends are the same, and the pixel value difference between the first pixel and the second pixel is larger than the predetermined threshold value, utilizing the pixel value of the first pixel and the pixel value of the third pixel to interpolate the pixel value of the target pixel.

17. The pixel interpolation method of claim 15, further comprising:
    detecting whether angle differences between the possible edge angle with a plurality of existing edge angles of pixels, horizontally neighboring to the target pixel, is less than a group angle threshold value;

if the angle differences are less than the group angle threshold value and the pixel value difference between the first pixel and the second pixel is larger than the predetermined threshold value, utilizing the pixel value of the first pixel and the pixel value of the third pixel to interpolate the pixel value of the target pixel.

18. A pixel interpolation system for generating a target pixel in a target position of a frame, the pixel interpolation system comprising:

an edge angle detector for determining a possible edge angle associated with the target pixel;

a plane background detecting module coupled to the edge angle detector for detecting whether a pixel value difference between a first pixel on the possible edge angle and a second pixel, horizontally neighboring to the first pixel, is larger than a predetermined threshold value;

a pixel interpolation device coupled to the plane background detecting module and the edge angle detector for utilizing a pixel value of a third pixel on the possible edge angle and a pixel value of the first pixel to interpolate the pixel value of the target pixel if the value difference between the first pixel and the second pixel is larger than the predetermined threshold value; and wherein the first and the third pixel reside in different scan lines on different sides of the target pixel.

19. The pixel interpolation system of claim 18, further comprising:

a group edge angle detecting module coupled to the pixel interpolation device for detecting angle differences between a plurality of existing edge angles and the possible edge angle is less than a group angle threshold value; and wherein the pixel interpolation device utilizes pixel values of the third pixel and the first pixel to interpolate the pixel value of the target pixel if the value difference between the first pixel and the second pixel is larger than the predetermined threshold value and the angles difference are less than the group angle threshold value.

20. The pixel interpolation system of claim 18, further comprising:

a pixel value distribution detecting module coupled to the pixel interpolation device for detecting whether a pixel value distribution trend of a first pixel and a pixel, horizontally neighboring to the first pixel, and a pixel value distribution trend of the third pixel and a pixel, horizontally neighboring to the third pixel, are the same; and wherein the pixel interpolation device utilizes pixel values of the third pixel and the first pixel to interpolate the pixel value of the target pixel if the pixel value distribution trends are substantially the same and the pixel value difference between the first pixel and the second pixel is larger than the predetermined threshold value.

21. The pixel interpolation system of claim 20, further comprising:

a group edge angle detecting module coupled to the pixel interpolation device for detecting angle differences between a plurality of existing edge angles and the possible edge angle is less than a group angle threshold value; and wherein the pixel interpolation device utilizes pixel values of the third pixel and the first pixel to interpolate the pixel value of the target pixel if the pixel value distribution trends are substantially the same, the value difference between the first pixel and the second pixel is larger than the predetermined threshold value, and the angles difference are less than the group angle threshold value.

* * * * *